United States Patent
Cantrell

(10) Patent No.: US 8,832,681 B1
(45) Date of Patent: Sep. 9, 2014

(54) BUNDLED MOBILE/DESKTOP APPLICATION PACKAGE

(75) Inventor: Christian Cantrell, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1194 days.

(21) Appl. No.: 12/202,105

(22) Filed: Aug. 29, 2008

(51) Int. Cl.
*G06F 9/445* (2006.01)

(52) U.S. Cl.
CPC .................................. *G06F 8/61* (2013.01)
USPC ............................... 717/177; 717/172

(58) Field of Classification Search
CPC ..................... G06F 8/61; G06F 8/65
USPC .................. 717/175, 176, 177, 172
See application file for complete search history.

(56) References Cited

U.S. PATENT DOCUMENTS

| | | | |
|---|---|---|---|
| 6,298,422 B1 * | 10/2001 | Spilo et al. ............... | 711/154 |
| 6,496,979 B1 * | 12/2002 | Chen et al. ............... | 717/178 |
| 6,701,521 B1 * | 3/2004 | McLlroy et al. .......... | 717/173 |
| 6,771,290 B1 * | 8/2004 | Hoyle ....................... | 715/745 |
| 7,124,374 B1 | 10/2006 | Haken | |
| 7,313,782 B2 * | 12/2007 | Lurie et al. ................ | 717/104 |
| 7,461,374 B1 * | 12/2008 | Balint et al. .............. | 717/174 |
| 7,506,335 B1 * | 3/2009 | Wooff et al. .............. | 717/173 |
| 7,584,470 B2 * | 9/2009 | Barker et al. ............. | 717/177 |
| 7,711,681 B2 | 5/2010 | Dempski et al. | |
| 7,765,542 B2 * | 7/2010 | Wiggins et al. ........... | 717/177 |
| 8,136,100 B1 * | 3/2012 | Goldman ................... | 717/136 |
| 8,316,364 B2 * | 11/2012 | Stein ......................... | 717/173 |
| 2002/0116698 A1 * | 8/2002 | Lurie et al. ................ | 717/100 |
| 2006/0123414 A1 * | 6/2006 | Fors et al. ................. | 717/177 |
| 2006/0143129 A1 * | 6/2006 | Holm et al. ............... | 705/52 |
| 2006/0294511 A1 * | 12/2006 | Bartley et al. ............ | 717/168 |
| 2007/0294685 A1 * | 12/2007 | Oh ............................ | 717/168 |
| 2008/0134165 A1 * | 6/2008 | Anderson et al. ......... | 717/173 |
| 2009/0100149 A1 * | 4/2009 | Arnold et al. ............. | 709/219 |
| 2009/0241104 A1 * | 9/2009 | Amiga et al. ............. | 717/174 |
| 2010/0125839 A1 * | 5/2010 | Gebis et al. ............... | 717/170 |

OTHER PUBLICATIONS http://developer.apple.com/documentation/mac/runtimehtml/RTArch-86.html, "Chapter 7—Fat Binary Programs," Mar. 11, 1997.
http://developer.apple.com/macosx/adoptinguniversalbinaries.html, "Adopting Universal Binaries on Mac OS X", Updated Feb. 22, 2007.

* cited by examiner

*Primary Examiner* — Phillip H Nguyen
(74) *Attorney, Agent, or Firm* — Shook, Hardy & Bacon L.L.P.

(57) ABSTRACT

The present disclosure includes, among other things, a method for distributing a software program included within a bundled software application package installed on a first computing device to a second computing device which is in communication with the first computing device.

29 Claims, 4 Drawing Sheets

BUNDLED MOBILE/DESKTOP APPLICATION PACKAGE

BACKGROUND

Software applications are accessed using a variety of devices and computing platforms. Users execute software applications, in some examples, on personal computers, laptop computers, server computers connected to client computers, mobile phones, smart phones, personal digital assistants (PDAs), personal navigation assistants (PNAs), media players, and gaming platforms. One or more individual devices may be capable of communicating with each other. Intra-device communication can be achieved using both wired (e.g., serial cable, FireWire, Universal Serial Bus (USB), docking terminal) and wireless (e.g., Bluetooth, Wi-Fi, infrared (IR), radio frequency (RF)) communication standards.

A user may execute the same or similar software application from a variety of computing devices. For example, a user may have an e-mail application installed on a desktop computer at work, a laptop computer at home, and a PDA for use during transit.

SUMMARY

In general, one or more aspects of the subject matter described in this specification can be embodied in one or more methods that include determining that a first computing device is in proximity of a second computing device. A first running application is identified on the first computing device where the first running application corresponds to a first program in a package on the first computing device. A distinct second program in the package is selected, the second program being a version of the first program that is compatible with the second computing device. The second program is installed on the second computing device by way of a communication link between the first computing device and the second computing device. Other embodiments of this aspect include corresponding systems, apparatus, and computer program products.

These and other embodiments can optionally include one or more of the following features. The installed second program is caused to execute on the second computing device. The communication link is established between a first computing device with a distinct second computing device. A document is synchronized for the first running application between the first computing device and the second computing device. During installation, it can be determined whether the second program already resides on the second computing device. One of the first program and the second program can be configured to be executed by a virtual machine. Selection of the first running application can include determining if the first running application has input focus. The communication link can be wireless. The selection can be performed by the second computing device.

In general, one or more aspects of the subject matter described in this specification can be embodied in one or more computer-readable mediums comprising a package, the package including installation files for a first application, installation files for a second application, the second application being a version of the first application, instructions for installing either the first application or the second application, where when the first application is installed, the installation files for the second application are included with the installed application.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
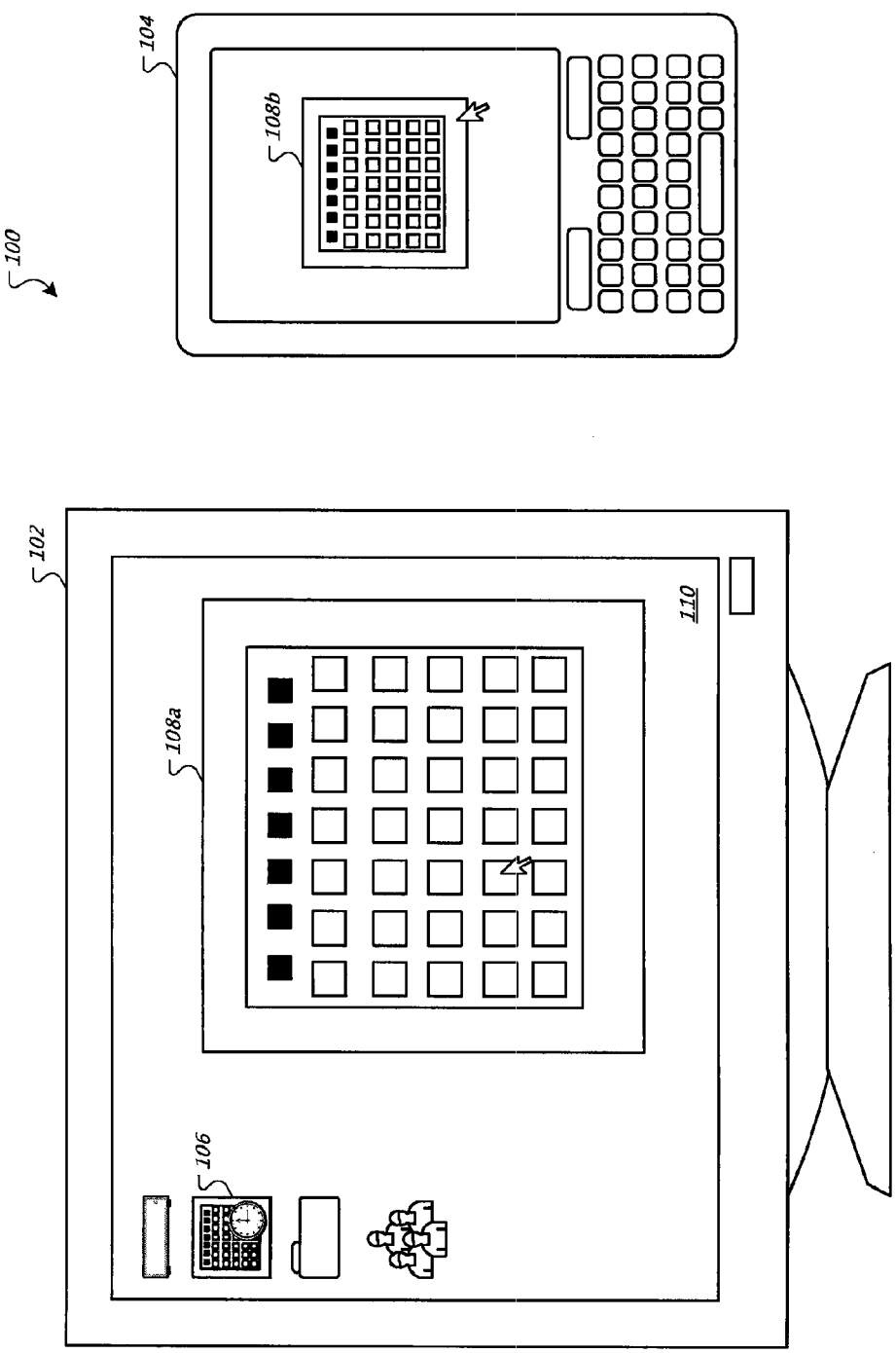
FIG. 1 shows an example of a desktop computing device and a handheld computing device running two different versions of the same software application.

FIG. 1 shows an example of a desktop computing device 102 and a handheld computing device 104, each running a distinct version of a software application 108*a* and 108*b*. A computing device, for example, can include a wired or wireless device such as a personal computer, laptop computer, mobile phone, smart phone, personal digital assistant (PDA), personal navigation assistant (PNA), media player, or gaming platform capable of executing a software application. Computing devices can differ in hardware and/or software capabilities. For example, the monitor of the desktop computing device 102 has a larger display area than the screen of the handheld computing device 104. The handheld computing device 104, in another example, may include a touch screen or stylus for input, while the desktop computing device 102 uses a keyboard and mouse. Software applications can be optimized to run upon different devices depending upon the hardware and/or software capabilities of each device. In some implementations, a software application version configured to run on one device may have more capabilities than a version of the same software application configured to run on a second device (e.g., based upon limited I/O capabilities, memory storage medium, etc.).

The desktop computing device 102 and the handheld computing device 104 can each be installed with an operating system (OS) (e.g., UNIX, Linux, MAC, Windows, etc.). The OS of a computing device manages the hardware resources of the computing device and the software applications executing upon the computing device. Each software application running within the OS of a computing device can take advantage of the hardware and/or software resources available within that computing device. Hardware resources, for example, can include a central processing unit (CPU) (e.g., x86 desktop, PowerPC, etc.), input/output (I/O) devices (e.g., keyboard, mouse, monitor, touch screen, stylus, track ball, speakers, etc.), storage media (e.g., disk drives, random access memory (RAM), read-only memory (ROM), etc.), and/or task-specific processors (e.g., graphics card, sound card, etc.). For example, the OS of the desktop computing device 102 can allocate storage space within one or more memory devices for the storage and execution of the software application 108*a*.

When the software application 108*a* is being executed, the OS can provide device drivers for the software application 108*a* to interact with the I/O devices of the desktop computing device 102. In some implementations, the software application 108*a* can be designed to take advantage of the capabilities of the OS running on the desktop computing device 102, the CPU of the desktop computing device 102, and/or the I/O devices available to the desktop computing device 102. For example, the software application 108*a* could be created to take advantage of the large display area, advanced audio system, faster network connection, or other feature(s) of the desktop computing device 102. The desktop computing device 102, in some implementations, can be installed with a different operating system (OS) version than is installed upon the handheld computing device 104.

The software application 108*b*, installed upon the handheld computing device 104, could similarly be optimized for running within the hardware and/or software capabilities of the handheld computing device 104. For example, the graphical user interface (GUI) of the software application 108*b* could be optimized for presentation within a small screen area such as the user interface of the handheld computing device 104.

The software application version 108*a* installed upon the desktop computing device 102 and the software application version 108*b* installed upon the handheld computing device 104 can belong to a software application package. The software application package can include multiple versions of a software program, each version created to run upon a different operating system (OS) platform, computing device type, and/or CPU. The software application package, for example, can be generated by combining shared software modules (e.g., software objects, processes, and/or procedures which are not specific to the hardware and/or software platform of the executing device) with device-specific software modules (e.g., software objects, processes, and/or procedures which are specific to the hardware and/or software capabilities of a type of device). In this manner, a portion of the software code can be shared between individual versions, allowing the software to be designed, tested, and packaged in a single multi-version bundle. In some implementations, when a software package is added to a computing device (e.g., the handheld computing device 104 or the desktop computing device 102), the software package can select a software application version which is optimized to run using the OS, device type, and/or CPU of the computing device upon which it is installed. In further embodiments, users can be prompted to select which software version will be installed. For example, there might be multiple versions of a calendaring application, each having different features or capabilities. The prompt can contain information about the application versions to help users make the selection.

A user installs the software application package including the software application version 108*a* upon the desktop computing device 102 and executes the software application version 108*a*. The software application package can include, for example, a desktop icon 106 which the user can select to execute the software application version 108*a* upon the desktop computing device 102. By way of illustration, the software application 108*a* is a calendar application program.

If the handheld computing device 104 is brought within proximity of the desktop computing device 102, the desktop computing device 102 can detect the presence of the handheld computing device 104 and establish a communication link with the handheld computing device 104. For example; the desktop computing device 102 can detect the handheld computing device 104 when the handheld computing device 104 is brought within wireless communication distance of the desktop computing device 102 (e.g., Bluetooth, Wi-Fi, infrared, etc.). In another example, the handheld computing device 104 can be physically connected to the desktop computing device 102 using any form of wired communication (e.g., using a USB cable, docking station, etc.).

By way of the communication link or other means, the desktop computing device 102 can determine the device profile of the handheld computing device 104. The device profile can include, for example, information identifying the type of device (e.g., PDA, smart phone, etc.), the OS platform installed on the handheld computing device 104, hardware specifications of the device (e.g., screen size, audio capabilities, etc.) and/or the type of CPU installed within the handheld computing device 104. Similarly, the handheld computing device 104 can receive a device profile outlining the hardware and/or software capabilities of the desktop computing device 102.

If the desktop computing device 102 determines that a version of the software application 108*a* is not yet installed upon the handheld computing device 104 and the software application package installed upon the desktop computing device 102 includes a version of the software application 108*a* (e.g., the software application 108*b*) which is compatible with the handheld computing device 104, the desktop computing device 102 can provide the software application 108*b* to the handheld computing device 104 for installation. Similarly, if the software application 108*b* were installed upon the handheld computing device 104 but not upon the desktop computing device 102, the handheld computing device could select a version of the software application 108*b* (e.g., the software application 108*a*) to provide to the desktop computing device 102.

In some implementations, the desktop computing device 102 selects a program version of a software application to provide to the handheld computing device 104 based upon whether or not the associated application has current input focus. For example, because the application 108*a* is presently active within the user interface (UI) 110 of the desktop computing device 102, the desktop computing device 102 may attempt to install the associated application version 108*b* upon the handheld computing device 104. For example, the desktop computing device 102 can provide information, including execution instructions, to the handheld computing device 104 to cause the installation (and, potentially, the execution) of the software application 108*b*.

In other implementations, the desktop computing device 102 and/or the handheld computing device 104 could provide a version of a software application to the peer device 102, 104 based upon user preferences (e.g., preference settings within the computing device 102, 104 which may have a software application to share with a peer), peer device user preferences (e.g., preferences listed within the device profile of the peer computing device 102, 104 which may be the recipient of a shared application), or direct user input (e.g., through the UI of the software application 108*a*, 108*b*) to install the an application version on the peer computing device 102, 104.

Returning to the previous example, while sharing the software application version 108*b* with the handheld computing device 104, the desktop computing device 102 can instruct the handheld computing device 104 to launch the software application 108*b*. In some implementations, the desktop computing device 102 provides state information (e.g., user preference settings pertaining to the software application 108*a*, one or more user-created documents which may be presently active within the software application 108*a*, cursor position, editing tool selection, visible region of the active document(s), etc.) to the handheld computing device 104 regarding the application 108*a*. The state information, for example, can be used by the handheld computing device 104 to run the software application 108*b* in a manner which mimics the look, feel, and/or capabilities of the software application 108a as it appears within the UI 110 of the desktop computing device 102 as closely as possible. For example, if the user is running the software application 108a to edit a particular calendar appointment on the UI 110 of the desktop computing device 102, the handheld computing device 104 can be instructed to open the same calendar appointment using the software application 108b. In this manner, the user can leave the software application 108a on the desktop computing device 102 and continue to work on the same data within the software application 108b upon the handheld computing device 104 without having to set up the application environment.

Further, in some implementations, data associated with the software applications 108a and 108b can be synchronized between the desktop computing device 102 and the handheld computing device 104 when the two computing devices 102, 104 are within proximity of each other. The device profiles shared between the handheld computing device 104 and the desktop computing device 102 can, for example, include a list of software programs which have already been installed upon the handheld computing device 104 using a software package stored within the desktop computing device 102 or vice-versa. In some implementations, the devices can query each other in order to determine the contents of the list of software programs. If the desktop computing device 102 finds that the handheld computing device 104 is already running the software application 108b, for example, the desktop computing device 102 and the handheld computing device 104 can synchronize data associated with the software applications 108a and 108b over the communication link or indirectly through one or more servers (e.g., 308). For example, any appointments added to the calendar application 108a while the user was working at the desktop UI 110 of the desktop computing device 102 can be uploaded to the handheld computing device 104.

In some implementations, one or more data files associated with the software applications 108a and 108b can be mirrored between the desktop computing device 102 and the handheld computing device 104. For example, the desktop computing device 102 can supply the handheld computing device with a mirrored copy of data files related to the software application 108a. The shared data file, for example, may be set to be read-only on the handheld computing device 104. If the handheld computing device 104 is going to be used to modify the shared data, the original data file within the desktop computing device 102 could be set to be read-only. For example, when the two devices are again within proximity, the desktop computing device 102 can receive a copy of the modified data file. The desktop computing device 102 can replace the read-only copy with the modified version received from the handheld computing device 104. If changes to a data file by multiple devices cannot be integrated, users can be prompted to resolve the conflicts.

In other implementations, modifications to the same data file(s) can be made on both the handheld computing device 104 and the desktop computing device 102. If the desktop computing device 102 and the handheld computing device 104 both contain modifications of a file since the last communication between the two computing devices 102, 104 (e.g., as can be determined using the timestamp on the file or other editing recognition method), the changes can be merged to create a new version of the data file.

In some implementations, shared data files can be stored within a storage medium accessible to both the desktop computing device 102 and the handheld computing device 104 (e.g., accessible via WAN, LAN, intranet, Internet, etc.).

Standard shared file methods can be used to protect the data integrity of the files. Other synchronization methods are possible.

Figure 2:
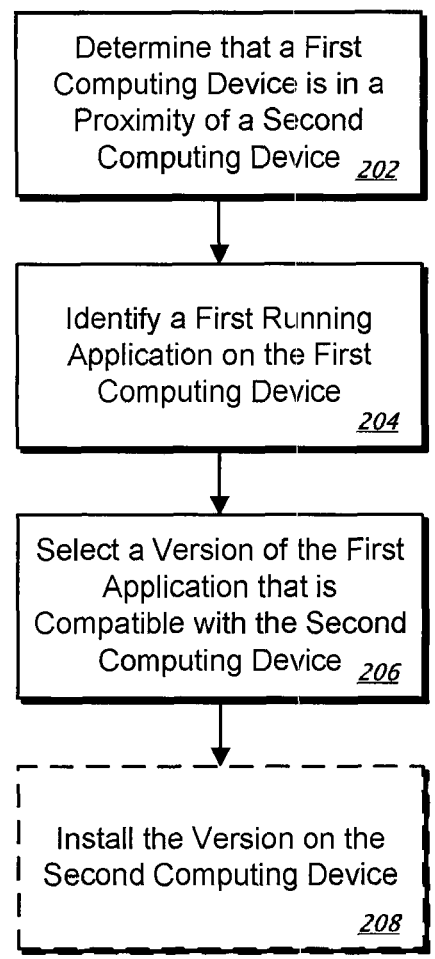
FIG. 2 shows a flowchart of an example technique for launching on, or installing onto, a second device a version of a software application which is running on a first device.

FIG. 2 shows a flowchart of an example technique 200 for launching on, or installing onto, a second device a version of a software application which is running on a first device. The software application can be part of a package including multiple program versions for execution on a variety of OS platforms, device types, and/or device hardware configurations. In some implementations, individual software applications within the package can include different capabilities. For example, a software application version for use on a small handheld computing device with limited screen size, memory storage, and audio options can have fewer capabilities than a software application version for use on a desktop computing device with a widescreen monitor, large data storage medium, and advanced sound card.

The method 200 begins with determining that a first computing device is within proximity of a second computing device (step 202). The first computing device can detect the second computing device as a new hardware peer using standard hardware detection routines, for instance. Detection of the second computing device can include receiving a device profile listing hardware and/or software capabilities of the device (e.g., CPU type, I/O device capabilities, OS version, etc.). The first computing device and the second computing device can communicate via a wired or wireless link.

For example, the desktop computing device 102 (as shown in FIG. 1) can detect the handheld computing device 104 when the handheld computing device 104 is placed into a docking station attached to the desktop computing device 102. In another example, the desktop computing device 102 can detect the handheld computing device 104 when the handheld computing device 104 comes within proximity of wireless connection (e.g., Bluetooth, infrared, Wi-Fi, etc.) of the desktop computing device 102.

A first application is detected as running on the first computing device (step 204). The first application, for example, could be the application which has input focus (e.g., active within the user interface of the first computing device). In other implementations, the first application can be any application which is executing on the first computing device. For example, the desktop computing device 102 can recognize that the application 108a is running on the user interface 110.

A version of the first application that is compatible with the second computing device is selected (step 206). In some implementations, multiple versions of the first application are bundled within a package. Based upon the device profile of the second computing device, for example, the first computing device can select an appropriate program version. In further implementations, application version can be retrieved from a server (e.g., 308)

The selected version is optionally installed on the second computing device (step 208). In some implementations, the second version is not installed on the second computing device if it is already installed. The first computing device can contact the second computing device to provide the application. In some implementations, the first computing device uploads the application to the second computing device based upon a request for data from the second computing device. For example, the second computing device could request the currently running application(s) from the first computing device. In another example, the first computing device can provide the application to the second computing device along with instructions regarding the installation (and, optionally, execution) of the selected version. The instructions, in some implementations, can include an installer software module and/or data synchronization software module. The installer software module, the data synchronization software module, and/or the application can be provided in virtual machine code. In some implementations, the application version can be provided from a server connected to both the first computing device and the second computing device.

In some implementations, the first computing device can also share additional data files (e.g., application settings, open documents, etc.) with the second computing device. The second computing device, for example, could use the additional data to invoke the application into the present state as viewed from the user interface of the first computing device. For example, the desktop computing device 102 could share the appointment files and application state information with the handheld computing device 104 so that the handheld computing device 104 can open the calendar application 108b providing the user with the same information as is presented within the user interface 110 of the desktop computing device 102.

Figure 3:
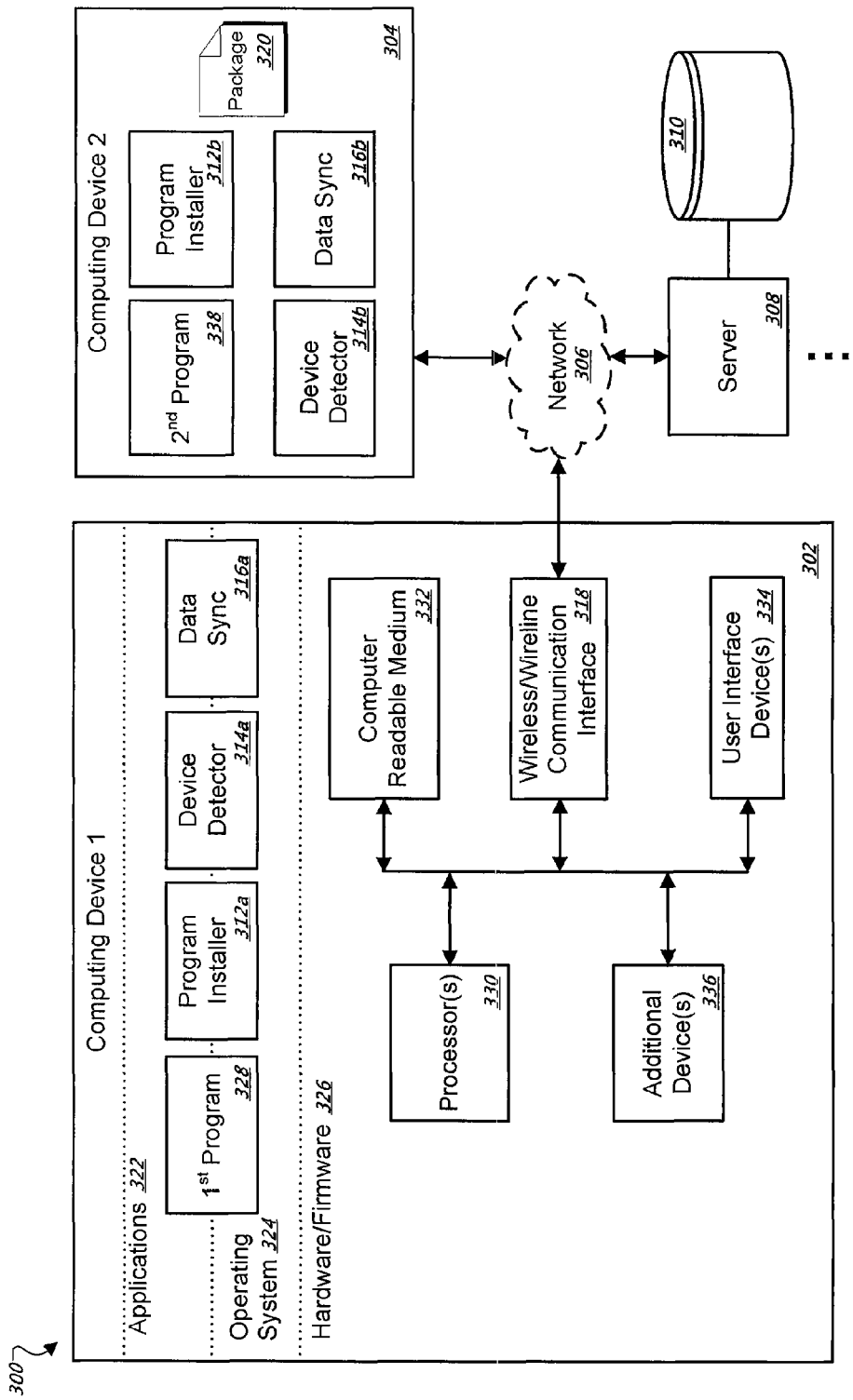
FIG. 3 shows an architectural diagram of two networked computing devices which can share software application installations.

FIG. 3 shows an architectural diagram 300 of two networked computing devices which can share software application installations. A first computing device 302 and a second computing device 304 communicate across a network 306. The network 306 is additionally connected to one or more servers 308. The servers 308 have access to a storage device 310. The first computing device 302 and the second computing device 304 each include a program installer 312, a device detector 314, and a data synchronization module 316. Using the device detector 314, the first computing device 302 and the second computing device 304 can gain awareness of the other through a communication interface provided by the network 306 (e.g., using a wireless or wireline communication interface 318). Alternatively, the first and second computing devices 302, 304 can be directly connected to each other. The two devices 302, 304 can then use the program installer 312 to share applications (e.g., an application bundled within a package 320 stored on the second computing device 304). The two devices 302, 304 can also share data using the data synchronization module 316.

The first computing device 302 includes an applications layer 322, an operating system 324, and a hardware/firmware layer 326. Within the applications layer 322 and/or the operating system layer 324, the computing device 302 has a first program 328, the program installer 312a, the device detector 314a, and the data synchronization module 316a.

The first program 328 can be executed on one or more processors 330 within the hardware/firmware layer 326. The processor(s) 330 are in communication (e.g., system bus) with a computer readable medium 332, the wireless/wireline communication interface 318, and one or more user interface devices 334. The first program 328 can be stored on the computer readable medium 332. The first program 328 can be presented on the user interface device(s) 334 (e.g., output devices such as a monitor, display screen, touch screen, audio speaker(s), etc.). One or more additional devices 336 can interact with the first program 328 as well (e.g., input devices such as a mouse, keyboard, stylus, peripheral devices such as a video camera, etc.).

The first program 328 may have been transferred to the first computing device 302 from the second computing device 304. For example, the package 320 installed on the second computing device 304 could contain both the first program 328 and a second program 338. The individual programs within the package 320 can be generated using a variety of source code programs and/or software development platforms. In some implementations, one or more of the programs within the package 320 can be configured to be executed on a virtual machine (e.g., Java by Sun Microsystems of Santa Clara, Calif., .NET Framework by Microsoft, Corp. of Redmond, Wash., Adobe Flash by Adobe Systems, Inc. of San Jose, Calif., etc.).

When the first computing device 302 and the second computing device 304 come within proximity of each other (e.g., using the network 306), the second computing device can detect the first computing device using the device detector 314b. The network 306, for example, could include a BlueTooth, RF, Wi-Fi, or other wireless communication medium. The network 306, in some implementations, can be connected to a greater networking region (e.g., LAN, WAN, intranet, internet, etc.). When the second computing device 304 detects the first computing device 302, the first computing device 302 can share information regarding the operating system 324 and/or the hardware/firmware 326 available within the first computing device 302.

The second computing device 304, using the information regarding the operating system 324 and/or the hardware/firmware 326, can select an appropriate application version from within the program package 320. The program package 320, for example, can contain any number of versions of an application, each version specific to a different device platform (e.g., OS, software, and/or hardware compatibility) and, in some implementations, instructions for installing the application versions and/or application version installation files on a computing device. The second computing device 304 can then provide the program version (e.g., the first program 328) to the first computing device 302 through the network 306. In some implementations the second computing device 304 provides the first program 328 to the first computing device 302 upon request by the first computing device 302. For example, user settings within the first device 302, shared with the second computing device 304 (e.g., through a device profile, etc.) can define whether or not the first device 302 is willing to accept programs from the second computing device 304. In further implementations, the entire application package 320 is sent to the first computing device 302 whereupon one of the application versions is installed and the installation files for the versions which are not installed are included with the installed application. For example, the package 320 can include installation instructions for each application version such that when one of the versions is installed, the installation instructions copy the installation files for the remaining versions into one or more installation locations for the installed version.

In some implementations, the program version can be stored within the network 306. For example, the program package 320 or portions of the program package 320 could be stored within the storage device 310, accessible to the second computing device 304 through the network 306.

Upon receipt of the first program 328 (e.g., installation files for the first program), the first computing device 302 can install the first program 328 using the program installer 312a. In some implementations, the program installer 312a can be provided to the first computing device 302 along with the first program 128. For example, the program installers 112a, 112b can be identical program installers (e.g., written in a virtual machine language such as Java, .NET Framework, Adobe Flash, etc.).

The program 328 can then run at the application level 322 of the first computing device 302. The first computing device 302 could additionally receive data files from the second computing device 304. Using these data files, the data synchronization module 316a on the first computing device 302 could synchronize the present state of the first program 328 (e.g., user interface preferences, open file(s), etc.) with the second program 338 on the second computing device 304. In some implementations, the data synchronization module 316a can be provided to the first computing device 302 along with the first program 128. The data synchronization module 316a can be generated using a variety of source code programs and/or software development platforms. In some implementations, one or more of the programs within the package 320 can be configured to be executed on a virtual machine (e.g., Java, .NET Framework, Adobe Flash, etc.). In further implementations, data can be synchronized from the server 308 to one of the devices 302, 304.

In some implementations, data files can be stored within the storage device 310 accessible to the computing devices 302, 304 via the server(s) 308 connected to the network 306. For example, an email program could have email files (e.g., saved mail, new mail messages, contact information, etc.) residing on the storage device 310 within the network 306. The second computing device 304 could pass information on obtaining the necessary files from the storage device 310 to the first computing device 302. The information can include a path name, user identification, and/or security information (e.g., password(s), etc.).

After synchronizing the first program 328 with the second program 338, the user can begin to interact with the first program 328, potentially picking up in the middle of an activity which was begun on the second computing device 304. The first computing device 302 and the second computing device 304 could be taken out of proximity at this time. For example, the first computing device 302 could be a handheld computing device which the user carries to a new location. In some implementations, the data (e.g., user files) shared with the first device 302 can be locked within the second computing device 304 when the user transfers the application and data information to the first computing device 302. For example, a word processing document provided to the first computing device 302 could then be set to a read-only state within the second computing device 302 to ensure data consistency. In other implementations, changes can be made to the same set of data within both the first device 302 and the second device 304. For example, the data could reside within the storage device 310 on the network 306 where either device 302, 304 can access a single set of data.

At some point in the future, when the two devices 302, 304 are again within proximity, the data synchronization module 316a within the first computing device 302 can transfer any updated information to the second computing device 304 for synchronization. The data synchronization module 316b on the second computing device 304 can synchronize the locally cached copy of each data file with the modified data file from the first computing device 302. In some implementations, data synchronization includes merging the changes made by the first computing device 302 with the changes made by the second computing device 304.

Figure 4:
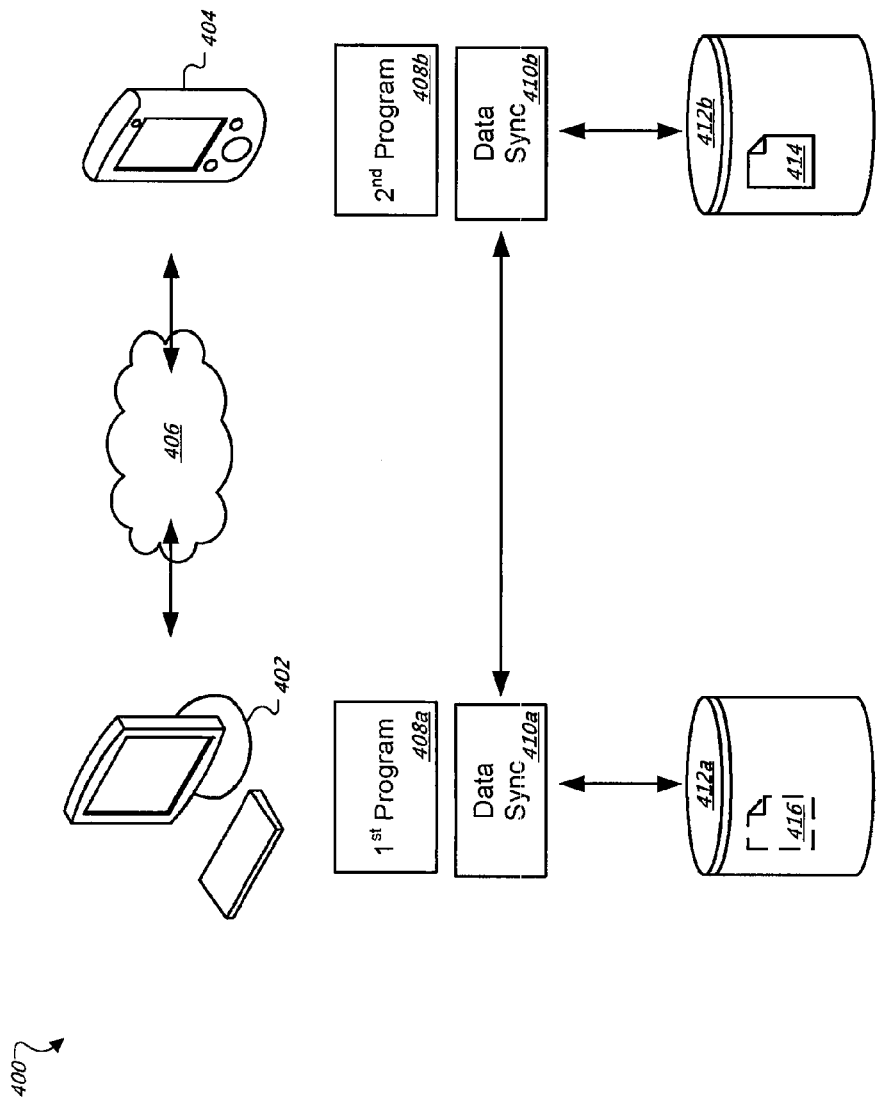
FIG. 4 shows an example of synchronizing data between two devices running the same software application.

FIG. 4 shows an example of a system 400 for synchronizing data between two devices running different versions of the same software application. The system 400 can be used, for example, to distribute and execute software applications installed using a bundled software program. The system 400 includes a desktop computing device 402 and a handheld computing device 404 connected by a network 406. A software application program 408a, 408b and a data synchronization application 410a, 410b are installed on each device 402, 404.

The data synchronization application 410 allows user data and/or data related to the software application 408 to be synchronized across the two devices 402, 404. The synchronized data can include, for example, files presently opened for viewing and/or editing within the software application 408, user settings and preferences related to the software application 408, and/or present state information regarding the software application 408. For example, upon connecting via the network 406, the handheld computing device 404 could provide the desktop computing device 402 with the current document(s) opened by the second software application program 408b, along with the user preferences for the user interface of the software application program 408b and the present state of the software application program 408b as it is being presented to the user (e.g., visible portion of the document which is the point of focus, present editing task selection(s), etc.).

The data synchronization applications 410a, 410b store the synchronized data within a storage medium 412a, 412b. For example, the handheld computing device 404 has an original document 414 within the storage medium 412b. Upon synchronization across the network 406, the data synchronization application 410b installed on the handheld computing device 404 can provide the desktop computing device 402 with a copy 416 of the original document 414. The data synchronization application 410a, installed on the desktop computing device 402, can save the copy 416 of the document 414 within the storage medium 412a.

In some implementations, changes can be made to both the original user document 414 and, the copy 416. When the devices 402, 404 next synchronize across the network 406, the data synchronization application 410a can provide the handheld computing device 404 with the modified copy 416. The data synchronization application 410b on the handheld computing device 404 can then merge the changes made to both the original document 414 and the copy 416. The data synchronization application 410b, installed on the handheld computing device 404, can then pass an updated copy 416 of the document 414 back to the desktop computing device 402.

In other implementations, the data synchronization applications 410a, 410b can negotiate for which device 402, 404 has editing permission to the document 414. For example, when the handheld computing device 404 synchronizes with the desktop computing device 402, the desktop computing device 402 can receive edit permission. The document 414 on the handheld computing device 404 would get marked as read-only while the copy 416 on the desktop computing device 402 would be marked as read-write. Later, upon the next synchronization (e.g., periodic scheduled synchronization times, the next time the desktop computing device 402 is within proximity of the handheld computing device 404, etc.) editing permissions could be passed back to the handheld computing device 404 along with the modified information contained within the copy 416.

Although the devices 402, 404 are shown as synchronizing data over a network 406, in some implementations, the devices 402, 404 can exchange data using a hardwired method. For example, the desktop computing device 402 could include a cabled docking station for the handheld computing device 404. When the handheld computing device 404 is docked within the docking station, the two devices 402, 404 can exchange information.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method comprising:
   determining that a first computing device is in a proximity of a second computing device; and
   pursuant to the determining:
      identifying a first running application on the first computing device where the first running application corresponds to a first program in a package, which includes multiple versions of the first program, on the first computing device;
      selecting a distinct second program from the multiple versions in the package, the second program being a version of the first program that is compatible with the second computing device but not compatible with the first computing device; and
      installing the second program on the second computing device by way of a communication link between the first computing device and the second computing device.

2. The method of claim 1, further comprising causing the installed second program to execute on the second computing device.

3. The method of claim 1, further comprising establishing the communication link between a first computing device with a distinct second computing device.

4. The method of claim 2, further comprising synchronizing a document for the first running application between the first computing device and the second computing device.

5. The method of claim 1 where installing comprises determining if the second program already resides on the second computing device.

6. The method of claim 1 where one of the first program and the second program are configured to be executed by a virtual machine.

7. The method of claim 1 where identifying the first running application comprises determining if the first running application has input focus.

8. The method of claim 1 where the communication link is wireless.

9. The method of claim 1 where the selecting is performed by the second computing device.

10. The method of claim 1 where installing the second program on the second computing device comprises transferring the package from the first computing device to the second computing device.

11. A computer program product, encoded on a computer-readable medium, operable to cause data processing apparatus to perform operations comprising:
    determining that a first computing device is in a proximity of a second computing device by detecting the presence of the second computing device; and
    pursuant to the determining:
       identifying a first running application on the first computing device where the first running application corresponds to a first program in a package on the first computing device, the package containing multiple versions of the first program, at least one of which is not compatible with the first computing device;

selecting a distinct second program from the multiple versions in the package, the second program being a version of the first program that is compatible with the second computing device; and installing the second program on the second computing device by way of a communication link between the first computing device and the second computing device.

12. The program product of claim 11, where operations further comprise causing the installed second program to execute on the second computing device.

13. The program product of claim 11, where operations further comprise establishing the communication link between a first computing device with a distinct second computing device.

14. The program product of claim 13, where operations further comprise synchronizing a document for the first running application between the first computing device and the second computing device.

15. The program product of claim 11 where installing comprises determining if the second program already resides on the second computing device.

16. The program product of claim 11 where one of the first program and the second program are configured to be executed by a virtual machine.

17. The program product of claim 11 where identifying the first running application comprises determining if the first running application has input focus.

18. The program product of claim 11 where the communication link is wireless.

19. The program product of claim 11 where the selecting is performed by the second computing device.

20. The program product of claim 11 where installing the second program on the second computing device comprises transferring the package from the first computing device to the second computing device.

21. A system comprising:
a display device;
a computer readable medium including a program product; and one or more processors configured to interact with the display device, execute the program product and perform operations comprising:

determining that a first computing device is in a proximity of a second computing device; and pursuant to the determining:

identifying a first running application on the first computing device where the first running application corresponds to a first program in a package, which includes multiple versions of the first program, on the first computing device;

selecting a distinct second program from the multiple versions in the package, the second program being a version of the first program that is compatible with the second computing device but not compatible with the first computing device; and installing the second program on the second computing device by way of a communication link between the first computing device and the second computing device.

22. The system of claim 21, where operations further comprise causing the installed second program to execute on the second computing device.

23. The system of claim 21, where operations further comprise establishing the communication link between a first computing device with a distinct second computing device.

24. The system of claim 22, where operations further comprise synchronizing a document for the first running application between the first computing device and the second computing device.

25. The system of claim 21 where installing comprises determining if the second device will accept programs from the first device.

26. The system of claim 21 where one of the first program and the second program are configured to be executed by a virtual machine.

27. The system of claim 21 where identifying the first running application comprises determining if the first running application has input focus.

28. The system of claim 21 where the communication link is wireless.

29. The system of claim 21 where the selecting is performed by the second computing device.

* * * * *